United States Patent
Shim et al.

(10) Patent No.: US 11,040,309 B2
(45) Date of Patent: Jun. 22, 2021

(54) BIOCIDE COMPOSITION AND METHOD

(71) Applicants: JUSTEQ, LLC, Deerfield, IL (US); ACCULAB CO., LTD., Seoul (KR)

(72) Inventors: Sang Hea Shim, Northbrook, IL (US); Chung Soo Kim, Seoul (KR)

(73) Assignees: JUSTEQ, LLC, Deerfield, IL (US); ACCULAB CO., LTD., Seoul (KR)

( * ) Notice: Subject to any disclaimer, the term of this patent is extended or adjusted under 35 U.S.C. 154(b) by 290 days.

(21) Appl. No.: 15/735,434

(22) PCT Filed: Jun. 9, 2016

(86) PCT No.: PCT/US2016/036623
§ 371 (c)(1),
(2) Date: Dec. 11, 2017

(87) PCT Pub. No.: WO2016/201060
PCT Pub. Date: Dec. 15, 2016

(65) Prior Publication Data
US 2019/0083933 A1  Mar. 21, 2019

Related U.S. Application Data

(60) Provisional application No. 62/343,996, filed on Jun. 1, 2016, provisional application No. 62/174,828, filed on Jun. 12, 2015.

(51) Int. Cl.
*B01D 61/02* (2006.01)
*B01D 65/08* (2006.01)
(Continued)

(52) U.S. Cl.
CPC .......... *B01D 61/025* (2013.01); *B01D 61/04* (2013.01); *B01D 65/08* (2013.01); *C02F 1/441* (2013.01);
(Continued)

(58) Field of Classification Search
None
See application file for complete search history.

(56) References Cited

U.S. PATENT DOCUMENTS 4,759,852 A * 7/1988 Trulear .................. C23F 11/10
                                                210/699
5,236,600 A * 8/1993 Hutchins ................. A61L 2/18
                                                210/739

(Continued)

FOREIGN PATENT DOCUMENTS

WO   WO2005019117        3/2005
WO   WO-2013140402 A1 *  9/2013  ............. A01N 25/02

OTHER PUBLICATIONS

Fane et al., Chapter 4.11 Membrane Technology for Water: Microfiltration, Ultrafiltration, Nanofiltration, and Reverse Osmosis, 301-335.
(Continued)

*Primary Examiner* — Krishnan S Menon
*Assistant Examiner* — Brad Gordon
(74) *Attorney, Agent, or Firm* — Barnes & Thornburg LLP

(57) ABSTRACT

The present disclosure relates to biocide compositions, formulations and methods for using formulations. In particular the present disclosure relates to biocide compositions and their use in treating reverse osmosis membranes.

7 Claims, 8 Drawing Sheets

(51) Int. Cl.
 C02F 1/44 (2006.01)
 B01D 61/04 (2006.01)
 C02F 1/76 (2006.01)
(52) U.S. Cl.
 CPC ............ *C02F 1/76* (2013.01); *B01D 2311/04* (2013.01); *B01D 2311/12* (2013.01); *B01D 2321/162* (2013.01); *C02F 1/442* (2013.01); *C02F 1/444* (2013.01); *C02F 2303/08* (2013.01); *C02F 2303/20* (2013.01); *C02F 2303/22* (2013.01)

(56) References Cited

U.S. PATENT DOCUMENTS

| | | | | |
|---|---|---|---|---|
| 6,478,972 | B1* | 11/2002 | Shim | A01N 59/00 162/161 |
| 6,620,441 | B1* | 9/2003 | Kendall | A01N 59/00 210/754 |
| 6,669,904 | B1* | 12/2003 | Yang | A01N 59/00 162/70 |
| 7,045,153 | B2* | 5/2006 | Howarth | A01N 59/00 424/723 |
| 7,341,671 | B2 | 3/2008 | Shim et al. | |
| 2002/0056689 | A1 | 5/2002 | Shim et al. | |
| 2004/0050800 | A1* | 3/2004 | Ito | B01D 61/04 210/764 |
| 2005/0147528 | A1* | 7/2005 | Shim | A01N 59/00 422/37 |
| 2006/0032823 | A1* | 2/2006 | Harrison | A61L 2/18 210/754 |
| 2010/0206809 | A1* | 8/2010 | Ikuno | B01D 61/08 210/638 |

OTHER PUBLICATIONS

PCT Search Report and Written Opinion for PCT/US2016/036623, dated Aug. 30, 2016.

Sagle, Alyson, et al., "Fundamentals of Membranes for Water Treatment," 2004, University of Texas at Austin, http://www.twdb.texas.gov/publications/reports/numbered_reports/, pp. 1-17.

* cited by examiner

BIOCIDE COMPOSITION AND METHOD

CROSS-REFERENCE TO RELATED APPLICATIONS

This application is a national stage entry under 35 USC § 371 of PCT International Application Number PCT/US2016/036623, filed Jun. 9, 2016, which claims priority under 35 U.S.C. § 119(e) to U.S. Provisional Application Ser. No. 62/174,828, filed Jun. 12, 2015 and U.S. Provisional Application Ser. No. 62/343,996, filed Jun. 1, 2016, each of which are incorporated herein by reference in their entirety.

FIELD OF THE INVENTION

The present disclosure relates to biocide compositions, formulations and methods for using formulations. In particular the present disclosure relates to biocide compositions and their use in treating reverse osmosis membranes. In particular, the present disclosure related to biocide compositions and their use in treating reverse osmosis membranes and system water.

BACKGROUND

Water scarcity is one of the most serious global challenges of our time. Desalination and water reuse are effective and reliable means to provide new water resources. Among the many methods available to treat water, reverse osmosis (RO) has widely demonstrated superior reliability and cost-effectiveness at removing dissolved species, such as salts and trace contaminants. RO is most commonly known for its use in purifying drinking water from seawater, brackish water or contaminated water, where RO removes salt and other dissolved or suspended materials from feedwater. RO has found use in other applications, such as to remove minerals from boiler water at power plants, to clean effluent and brackish groundwater, and for concentrating food liquids, such as milk.

Osmosis is the natural movement of water from an area of high water concentration (low salt concentration) through a salt barrier to an area of low water concentration (high salt concentration). Flow is driven by the difference in osmotic potential of the two solutions, quantified as osmotic pressure. Applying an external pressure to reverse the natural flow of water through the barrier is RO.

RO processes are built around semipermeable membranes capable of filtering out salts. The major membrane types that have been used in RO include cellulose acetate (CA), an early innovation in the field, and thin-film composite (TFC) membranes which are the industry standard today. TFC membranes exhibit much higher intrinsic water permeabilities than cellulose acetate membranes because of their extremely thin selective layers. Today, nearly all RO operations use TFC membranes. (SAGLE, A.; FREEMAN, B. (2004): Fundamentals of Membranes for Water Treatment. Austin, Tex.: University of Texas at Austin. Based on aromatic polyamides, TFC membrane fluxes and rejections are superior to CA membranes. Despite the great improvements in TFC membrane performance and cost, there are still shortcomings that hinder their application. These limitations include being prone to fouling and being susceptible to attack by oxidizing agents, such as chlorine.

It is believed in the art that the polyamide of a TFC membrane is susceptible to ring chlorination which can disrupt hydrogen bonding between chains and degrades the polymer matrix resulting in a dramatic reduction in salt rejection. Because TFC membranes can only tolerate up to about 1000 ppm/hr of chlorine exposure, additional pre-treatment steps to remove chlorine must be introduced into the RO process.

Fouling of TFC and CA membranes is a significant problem in RO. Fouling can occur on both the surface of a membrane or within its pores, and can cause significant decrease in flux. Fouling is caused by the deposition of slimy solids, which are present in the feed water, on the upstream membrane surface that eventually leads to blocking of the surface, cake formation and depth filtration. This phenomenon increases operating costs because higher pressures are needed to maintain the permeate flux, time and materials are needed for cleaning of the membrane, and the membrane needs to be replaced. The drop in flux is normally connected to two phenomena, namely, concentration polarization and fouling. Concentration polarization refers to the accumulation of particles in the solution phase near the membrane surface that generate osmotic back pressure and thereby indirectly increase the filtration resistance by reducing the effective transmembrane pressure (TMP).

The major types of fouling include, but are not limited to, biofouling, scaling, organic and colloidal. Biofouling results from microbial contamination of feed water and produces a biofilm on the surface of the membrane, which increases the resistance to water permeation through the membrane. Scaling arises from the precipitation and deposition of salts on the membrane surface. Organic fouling comes from substances such as hydrocarbons which coat the surface and/or plug pores in the porous support layer. Colloidal fouling mainly stems from particles, such as clay or silica, accumulating on the surface of the membrane. Attempts to control fouling have been made by adding disinfectants, anti-scaling agents, and other pre-treatment steps. However, these are not remedies to the problem, and fouling remains a key area in definite need of improvement for RO membranes To minimize the fouling problem that occurs in the membrane filtration system, several techniques can be applied. Generally, these techniques can be divided into controlling methods and cleaning methods. The major controlling methods include, but are not limited to, feed pre-treatment, membrane material selection and membrane surface modification.

Pre-treating the feed can reduce fouling either by physical or chemical processes. Pre-treatments are commonly used either to eliminate particulates that may cause blockage in the module or to prevent particulates or macromolecules from reaching and depositing on the membrane surface. They are also used to reduce the total contaminant load in downstream membrane modules.

Chemical processes include the adjustment of the pH of the feed to have molecular and colloidal foulants far from their isoelectric point, which reduces their tendency to form a gel layer. For example, divalent ions need to be removed from the feed solution using ion exchange as they can cause precipitation by bridging macromolecular chains. On the other hand, monovalent ions may prevent precipitation and fouling. Chemical processes may also involve precipitation, coagulation, flocculation and the use of proprietary chemicals, such as anti-scalants or disinfectant.

Cleaning methods include several techniques to remedy membrane fouling. A cleaning method is often employed when control methods have failed. One such cleaning method is the use of biocides. Such biocides can be categorized as oxidizing biocides and non-oxidizing biocides.

Oxidizing biocides, usually chlorine in the form of sodium hypochlorous acid or, less frequently, as chlorine gas, is used to pretreat the feed water that is put through the RO membrane. Because RO membranes are sensitive to oxidizing agents, the chlorine requires dehalogenation by a reducing agent such as sodium metabisulfite or sodium bisulfite. The dehalogenation process increases costs because of the additional chemicals that must be purchased. It is inconvenient because it adds the additional step. It is also ineffective because the biocide is denatured prior to reaching the RO membrane. Therefore, any slime masses that are not eliminated prior to reaching the RO membrane attach and grow there. Because there is no active biocide reaching the RO membrane, the biofouling worsens until the inconvenience of manual clean-up is required. Furthermore, because chlorine is so active, it is not able to penetrate slime masses. This permits even more biofouling of the RO membrane. Chlorine exhibits several other drawbacks: it is highly corrosive; it has a short shelf-life because it evaporates quickly; and it has a strong odor.

Non-oxidizing biocides, such as isothiazolone and dibromonittrilopropionamide (DBNPA), are frequently used in RO systems because they do not need to be dehalogenated prior to coming into contact with the RO membrane. However, these non-oxidizing biocides can be highly toxic. As such, both isothiazolone and DBNPA cannot be used for online RO systems that produce potable and municipal water. They can only be used for the industrial market or for off-line cleaning of RO membranes. Another drawback to such non-oxidizing biocides is price. These types of biocides are several times more expensive than chlorine. Additionally, these non-oxidizing biocides are not highly effective in eliminating slime and algae masses that can attach to RO membranes. Thus, although the biocide is reaching the RO membrane, because the biocides are not effective, the biofouling grows until a manual clean-up procedure is required.

Because of the drawbacks of existing biocides used in connection with RO membranes, and semi-permeable membranes in general, there exists a need for more efficient, economical and compatible biocide compositions and methods for controlling fouling of semi-permeable membranes, including RO membranes, and for cleaning semi-permeable membrane, including RO membranes.

Throughout this disclosure, various publications, patents and patent applications are referenced. The disclosures of these publications, patents and applications in their entireties are hereby incorporated by reference into this disclosure.

SUMMARY

It has been discovered that certain biocide compositions of hypobromous acid (HOBr) formed from contacting a stabilized hypochlorous acid (a.k.a. stabilized chlorine) solution with a water soluble bromide ion source ($Br^+$).

In some embodiments, the present disclosure provides a method of maintaining a reverse osmosis system comprising
  a. preparing a stabilized hypochlorous acid solution comprising a chlorine source and a stabilizing agent;
  b. consecutively or simultaneously applying the stabilized hypochlorous acid solution formed from step (a) and a water soluble bromide ion source to a reverse osmosis membrane.

In some embodiments, the present disclosure provides a method of cleaning a reverse osmosis membrane comprising
  a. preparing a stabilized hypochlorous acid solution comprising a chlorine source and a stabilizing agent;
  b. consecutively or simultaneously applying the stabilized hypochlorous acid solution formed from step (a) and a water soluble bromide ion source to the reverse osmosis membrane.

In some embodiments, the present disclosure provides a method of defouling a reverse osmosis membrane comprising
  a. preparing a stabilized hypochlorous acid solution comprising a chlorine source and a stabilizing agent;
  b. consecutively or simultaneously applying the stabilized hypochlorous acid solution formed from step (a) and a water soluble bromide ion source to the reverse osmosis membrane.

In some embodiments, the present disclosure provides a method of maintaining a reverse osmosis system comprising
  a. preparing a stabilized hypobromous acid solution formed by contacting a stabilized hypochlorous acid solution comprising a chlorine source and a stabilizing agent with a bromide ion from a water soluble bromide ion source;
  b. applying the stabilized hypobromous acid solution formed from step (a) to a reverse osmosis membrane.

In some embodiments, the present disclosure provides a method of cleaning a reverse osmosis membrane comprising
  a. preparing a stabilized hypobromous acid solution formed by contacting a stabilized hypochlorous acid solution comprising a chlorine source and a stabilizing agent with a bromide ion from a water soluble bromide ion source;
  b. applying the stabilized hypobromous acid solution formed from step (a) to a reverse osmosis membrane.

In some embodiments, the present disclosure provides a method of defouling a reverse osmosis membrane comprising
  a. preparing a stabilized hypobromous acid solution formed by contacting a stabilized hypochlorous acid solution comprising a chlorine source and a stabilizing agent with a bromide ion from a water soluble bromide ion source;
  b. applying the stabilized hypobromous acid solution formed from step (a) to a reverse osmosis membrane.

In some embodiments, the present disclosure provides a method of cleaning a reverse osmosis membrane comprising
  a. preparing a stabilized hypochlorous acid solution comprising a chlorine source and a stabilizing agent;
  b. consecutively or simultaneously applying the stabilized hypochlorous acid solution formed from step (a) and a water soluble bromide ion source to the reverse osmosis membrane.

In some embodiments, the present disclosure provides a method of defouling a reverse osmosis membrane comprising
  a. preparing a stabilized hypochlorous acid solution comprising a chlorine source and a stabilizing agent;
  b. consecutively or simultaneously applying the stabilized hypochlorous acid solution formed from step (a) and a water soluble bromide ion source to the reverse osmosis membrane.

In some embodiments, the present disclosure provides a method of maintaining a purification system comprising
  a. preparing a stabilized hypobromous acid solution formed by contacting a stabilized hypochlorous acid solution comprising a chlorine source and a stabilizing agent with a bromide ion from a water soluble bromide ion source;
  b. applying the stabilized hypobromous acid solution formed from step (a) to a semi-permeable membrane.

In some embodiments, the present disclosure provides a method of cleaning a semi-permeable membrane comprising
  a. preparing a stabilized hypobromous acid solution formed by contacting a stabilized hypochlorous acid solution comprising a chlorine source and a stabilizing agent with a bromide ion from a water soluble bromide ion source;

b. applying the stabilized hypobromous acid solution formed from step (a) to the semi-permeable membrane.

In some embodiments, the present disclosure provides a method of defouling a semi-permeable membrane comprising a. preparing a stabilized hypobromous acid solution formed by contacting a stabilized hypochlorous acid solution comprising a chlorine source and a stabilizing agent with a bromide ion from a water soluble bromide ion source;

b. applying the stabilized hypobromous acid solution formed from step (a) to the semi-permeable membrane.

BRIEF DESCRIPTION OF THE DRAWINGS

FIG. 2 shows test results recording the GPD of the product water from the RO membranes using the biocide composition described herein with various concentrations of the bromide source, all with a chlorine concentration of 6.7%, and at various pH levels in the treated water. Biocide concentration was controlled by maintaining a total chlorine count of approximately 2 ppm.

FIG. 3 shows test results recording the GPD of the drain water from the RO membranes at various concentrations of the biocide composition described herein, and at various pH levels in the treated water. Biocide concentration was controlled by maintaining a total chlorine count of approximately 2 ppm.

FIG. 4 shows the percent recovery taken as the permeate rate from FIG. 2 divided by the sum of the permeate rate from FIG. 2 and concentrate rate from FIG. 3.

FIG. 5 shows test results recording the permeate TDS of the permeate water from the RO membranes at various concentrations of the biocide composition described herein, and at various pH levels in the treated water. Biocide concentration was controlled by maintaining a total chlorine count of approximately 2 ppm.

FIG. 6 shows the percent recovery taken as the permeate TDS divided by the feed TDS.

DETAILED DESCRIPTION

Figure 1:
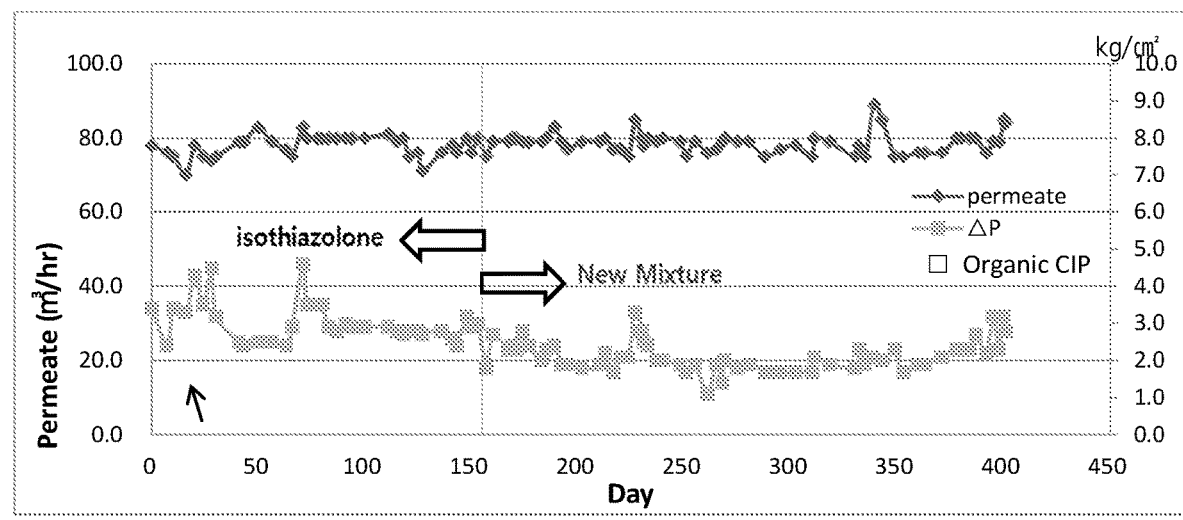
FIG. 1 shows test results of online treatment of an RO system with comparator cleaner isothiazolone versus the stabilized chlorine/bromide mixture described herein. The plot shows that the RO system was treated with isothiazolone from day 1 to day 170 at which time the stabilized chlorine/bromide mixture replaced the isothiazolone. The performance of the solutions in the RO system was measured by permeate volume (♦); average delta pressure (■) and time interval between organic clean-in-place procedure (□).

Compositions of hypobromous acid, and methods for producing the same, for defouling aqueous systems that are useful in connection with the present teachings include those described in U.S. Pat. Nos. 6,478,972 and 7,341,671, incorporated herein by reference. In some embodiments, such compositions can be characterized by a mixture of stabilized chlorine and a small percentage of sodium bromide useful as a biocide. In some embodiments, hypobromous acid (HOBr) can be formed by the reaction between hypochlorous acid (HOCl) and a water soluble bromide ion source ($Br^+$). In some embodiments, a stabilized hypochlorous acid solution is formed by contacting a chlorine source with a stabilizing agent in an aqueous solution.

Suitable chlorine sources for use in connection with the present disclosure include but are not limited to alkali or alkaline earth metal hypochlorite or chlorine gas. Suitable alkali or alkaline earth metal hypochlorites useful in the present invention include sodium hypochlorite, potassium hypochlorite, lithium hypochlorite, magnesium hypochlorite, calcium hypochlorite, a chlorinating agent, such as trichloroisocyanuric acid, sodium dichlorocyanuric acid, or dichlorohydantoin, and mixtures thereof. In some embodiments, the chlorine source can be sodium hypochlorite or calcium hypochlorite.

The alkali or alkaline earth metal hypochlorous acid preferably contains about 5 to about 70% of chlorine as active halogen.

Suitable bromide ion source useful in the present invention include, but are not limited to, sodium bromide, potassium bromide, lithium bromide, chlorine bromide, and bromine. In some embodiments, the bromide ion source can be sodium bromide.

Suitable stabilizers useful in the present invention include, but are not limited to, acid amide derivatives of carbonic acid, carboxylic acid, amino acid, sulfuric acid, or phosphoric acid, and the acid amide derivatives are exemplified by urea, thiourea, creatinine, mono or di-ethanolamine, organic sulfonamide, biuret, sulfamic acid, organic sulfamate, melamine, and the like. In some embodiments, the stabilizer can be sulfamic acid.

In some embodiments, the stabilized hypochlorous acid can be prepared in an alkali solution having a pH of at least 11. In some embodiments, a stabilized aqueous alkali or alkaline earth metal hypochlorous acid solution is prepared by primarily dissolving a stabilizer in an alkali solution having a pH of at least 11, and then adding a chlorine source including, for example, alkali or alkaline earth metal hypochlorite into the solution. The alkali solution can be formed by dissolving an inorganic base, such as sodium hydroxide, in water. It will be appreciated that the base (or caustic) used to prepare the alkali solution can be any inorganic base known in the art.

In accordance with the present disclosure, a stabilized aqueous hypochlorous acid solution can be prepared by reacting a chlorine source with a stabilizer in a molar ratio of 1:9 to 9:1. The stabilized aqueous hypochlorous acid solution can be supplemented with a bromide ion source in a molar ratio of 1:10 to 50:1, and more preferably, 1:1 to 20:1.

A biocide prepared according to the method of the present disclosure is, preferably, added to water systems in the level of 0.1 to 10 ppm total halogen residual, and more preferably, 0.2 to 5 ppm.

The content of each ingredient depends on the degree of contamination. In some embodiments, the disclosure provides a biocide composition having from about 1% to about 20% by weight of a chlorine source. In some embodiments, the chlorine source is about 5% to about 10% by weight. In some embodiments, the chlorine source is about 3%, or about 4%, or about 5%, or about 6%, or about 7%, or about 8%, or about 9%, or about 10%, or about 11%, or about 12%, or about 13% by weight.

In some embodiments, the disclosure provides a biocide composition having from about 1% to about 20% by weight of a stabilizer. In some embodiments, the stabilizer is about 5% to about 10% by weight. In some embodiments, the stabilizer is about 3%, or about 4%, or about 5%, or about 6%, or about 7%, or about 8%, or about 9%, or about 10%, or about 11%, or about 12% by weight.

In some embodiments, the disclosure provides a biocide composition having from about 0.1% to about 15% by weight of a bromide ion source. In some embodiments, the bromide ion source is about 0.1% to about 5% by weight. In some embodiments, the bromide ion source is about 0.3% to about 5% by weight. In some embodiments, the bromide ion source is about 0.5% to about 5% by weight. In some embodiments, the bromide ion source is about 0.3% to about 2% by weight. In some embodiments, the bromide ion source is about 0.5% to about 2% by weight. In some embodiments, the bromide ion source is about 0.3% to about 1% by weight. In some embodiments, the bromide ion source is about 0.5% to about 1% by weight.

In some embodiments, the disclosure provides a biocide composition having from about 1% to about 15% by weight of a base. In some embodiments, the base is about 5% to about 10% by weight. In some embodiments, the base is about 3%, or about 4%, or about 5%, or about 6%, or about 7%, or about 8%, or about 9%, or about 10%, or about 11%, or about 12% by weight.

In any of the embodiments described herein, the remainder of a biocide composition prepared by the methods described can be water.

In any of the embodiments described herein, the water being treated with a purification system, including an RO system, can be from any source, such as municipal water sources, natural spring water sources, industrial water sources, oil and gas drilling water sources, ground water sources, recycled water sources, seawater, and the like. In any of the embodiments described herein, the pH of the water being treated by a purification system, including an RO can be in the range of about pH 5 to about pH 11. In some embodiments, the pH of the treated water can be in the range of about pH 6 to about pH 9. In some embodiments, the pH of the treated water can be in the range of about pH 6.5 to about pH 8.5. In some embodiments, the pH of the treated water can be in the range of about pH 7.0 to about pH 8.0. In some embodiments, the pH of the treated water can be about pH 5.0. In some embodiments, the pH of the treated water can be about pH 6.0. In some embodiments, the pH of the treated water can be about pH 7.0. In some embodiments, the pH of the treated water can be about pH 8.0. In some embodiments, the pH of the treated water can be about pH 9.0. In some embodiments, the pH of the treated water can be about pH 10.0. In some embodiments, the pH of the treated water can be about pH 11.0.

In addition, a biocide prepared according to the method of the present disclosure may further comprise a corrosion or scale inhibitor.

Examples of the anti-corrosion agent may include an anodic corrosion inhibitor, such as chromate, nitride, orthophosphate, silicate, or molybdate, and a copper corrosion inhibitor, such as mercaptobenzothiazole, benzothiazole, or tolyltriazole. Useful are organophosphates and acryl polymers as the scale inhibitor. The organophosphates are exemplified by triethanolamine phosphate (TEAP), aminotrimethylene phosphonic acid (AMP), 1-hydroxyethylidene-1,1-diphosphonic acid (HEDP), 2-phosphonobutane-1,2,4-tricarboxylic acid (PBTC), etc. Examples of the acryl polymers may include homo-acryl polymers, acryl co-polymers, and acryl tri-polymers.

According to the methods described herein, a mixture of stabilized chlorine and a small percentage of sodium bromide are formed in a solution that can be used as a liquid biocide in RO systems. According to the embodiments described herein, the methods described produce small amounts of bromine in situ. The amount of bromine formed is sufficient to control biofouling, but, unlike many conventionally known compositions, does not harm semi-permeable membranes (e.g. RO membranes) that are sensitive to oxidizing agents. In some embodiments described herein can be used in RO systems such as 1) for use in system water for online RO systems to prevent biofouling of RO membranes; and 2) for cleaning of fouled membranes during offline cleaning. In some embodiments described herein can be used in systems such as, 1) to prevent biofouling of membranes in various applications; and 2) cleaning of fouled membranes during offline cleaning.

The embodiments described in the present disclosure are useful for treating system water for online RO systems because the compositions and methods described control biofouling, but does not harm the Semi-permeable membranes. Because the compositions and methods described herein do not harm the Semi-permeable membranes, this eliminates the need for a separate dehalogenation process. This saves costs and makes RO system maintenance much more convenient. Additionally, because the biocide is not dehalogenated prior to reaching the Semi-permeable membrane, the biocidal effects reach the Semi-permeable membrane itself, thus helping to keep the membrane clean. This will greatly reduce, and even eliminate, the need for shutdowns that are currently necessary to clean fouled membranes.

The embodiments described in the present disclosure are also useful for the offline cleaning of biofouled Semi-permeable membranes. Because the compositions and methods described herein are not harmful to Semi-permeable membranes, Semi-permeable membranes that require cleaning can be soaked in the biocide solution without the need to strictly monitor and maintain immersion time limits. In addition, the compositions and methods described herein avoid complications of using conventional cleaning products known in the art. An additional advantage of the compositions and methods described herein is that, unlike other conventional compositions, the product compositions and methods described herein are not highly toxic. As a result, the compositions and methods described herein provide greater ease of use, especially when compared to the other cleaning products that are currently available.

The embodiments described in the present disclosure are useful for treating system water for online RO systems because the compositions and methods described control biofouling, but does not harm the RO membranes. Because the compositions and methods described herein do not harm the RO membranes, this eliminates the need for a separate dehalogenation process. This saves costs and makes RO system maintenance much more convenient. Additionally, because the biocide is not dehalogenated prior to reaching the RO membrane, the biocidal effects reach the RO membrane itself, thus helping to keep the membrane clean. This will greatly reduce, and even eliminate, the need for shutdowns that are currently necessary to clean fouled membranes.

The embodiments described in the present disclosure are also useful for the offline cleaning of biofouled RO membranes. Because the compositions and methods described herein are not harmful to RO membranes, RO membranes that require cleaning can be soaked in the biocide solution without the need to strictly monitor and maintain immersion time limits. In addition, the compositions and methods described herein avoid complications of using conventional cleaning products known in the art. An additional advantage of the compositions and methods described herein is that, unlike other conventional compositions, the product compositions and methods described herein are not highly toxic. As a result, the compositions and methods described herein provide greater ease of use, especially when compared to the other cleaning products that are currently available.

It will be appreciated by one of skill in the art that the biocide compositions described herein can be use in connection with any semi-permeable membrane known in the art. Non-limiting examples of membranes include any semi-permeable membrane filters, RO membrane filters, micro-filters, nano-filters, ultra-filters, thin-film composite (TFC) membranes, cellulose acetate (CA) membranes, polyamide membranes, microfiltration membranes, and ultrafiltration membranes. See, for example, A. G. Fane, C. Y. Tang, R. Wang, Membrane Technology for Water: Microfiltration, Ultrafiltration, Nanofiltration, and Reverse Osmosis, in: P. Wilderer (Ed.) *Treatise on Water Science,* 3Academic Press, Oxford, 2011, pp. 301-335.

Having generally described this invention, a further understanding can be obtained by reference to certain specific examples which are provided herein for purposes of illustration only and are not intended to be limiting unless otherwise specified.

The various embodiments of the subject matter contained herein can be described according to the following exemplary clauses:

1. A method of maintaining a reverse osmosis system comprising
   a. preparing a stabilized hypochlorous acid solution comprising a chlorine source and a stabilizing agent; and
   b. consecutively or simultaneously applying the stabilized hypochlorous acid solution formed from step (a) and a water soluble bromide ion source to a reverse osmosis membrane.

2. The method of clause 1, wherein the reverse osmosis system is used to treat water.

3. The method of clause 2, wherein the water is from a source selected from the group consisting of municipal water, natural spring water, industrial water, oil and gas drilling water, ground water, recycled water, and seawater.

4. The method of any of the preceding clauses, wherein the chlorine source is an alkali metal hypochlorite, a alkaline earth metal hypochlorite or chlorine gas.

5. The method of any of the preceding clauses, wherein the chlorine source is selected from the group consisting of sodium hypochlorite, potassium hypochlorite, lithium hypochlorite, magnesium hypochlorite, calcium hypochlorite, trichloroisocyanuric acid, sodium dichlorocyanuric acid, dichlorohydantoin, and mixtures thereof.

6. The method of any of the preceding clauses, wherein the chlorine source is an alkali or alkaline earth metal hypochlorous acid containing about 5 to about 70% of chlorine as active halogen.

7. The method of any of the preceding clauses, wherein the chlorine source is sodium hypochlorite or calcium hypochlorite.

8. The method of any of the preceding clauses, wherein the water soluble bromide ion source is selected from the group consisting of sodium bromide, potassium bromide, lithium bromide, chlorine bromide, and bromine.

9. The method of any of the preceding clauses, wherein the water soluble bromide ion source is sodium bromide.

10. The method of any of the preceding clauses, wherein the stabilizing agent is elected from the group consisting of acid amide derivatives of carbonic acid, a carboxylic acid, an amino acid, sulfuric acid, or phosphoric acid.

11. The method of any of the preceding clauses, wherein the stabilizing agent is sulfuric acid.

12. The method of any of the preceding clauses, wherein the pH of the water being treated by the reverse osmosis system is in the range of about pH 5 to about pH 11, or about pH 6 to about pH 9, or about pH 6.5 to about pH 8.5, or about pH 7.0 to about pH 8.0.

13. The method of any of the preceding clauses, wherein the pH of the water being treated by the reverse osmosis system is in the range of about pH 7.0 to about pH 8.0.

14. The method of any of the preceding clauses, wherein the stabilized hypochlorous acid solution further comprises a corrosion inhibitor or scale inhibitor.

15. The method of clause 14, wherein the corrosion inhibitor is selected from the group consisting of an anodic corrosion inhibitor, a copper corrosion inhibitor.

16. The method of clause 14, wherein the corrosion inhibitor is selected from the group consisting of a chromate, a nitride, a orthophosphate, a silicate, and a molybdate.

17. The method of clause 14, wherein the scale inhibitor is an organophosphate or an acryl polymer.

18. The method of clause 17, wherein the organophosphate is selected from the group consisting of triethanolamine phosphate (TEAP), aminotrimethylene phosphonic acid (AMP), 1-hydroxyethylidene-1,1-diphosphonic acid (HEDP) and 2-phosphonobutane-1,2,4-tricarboxylic acid (PBTC).

19. The method of clause 17, wherein the acryl polymer is selected from the group consisting of a homo-acryl polymer, an acryl co-polymer, and an acryl tri-polymer.

20. A method of cleaning a semi-permeable membrane comprising
   a. preparing a stabilized hypochlorous acid solution comprising a chlorine source and a stabilizing agent; and
   b. consecutively or simultaneously applying the stabilized hypochlorous acid solution formed from step (a) and a water soluble bromide ion source to the semi-permeable membrane.

21. A method of defouling a semi-permeable membrane comprising
   a. preparing a stabilized hypochlorous acid solution comprising a chlorine source and a stabilizing agent; and
   b. consecutively or simultaneously applying the stabilized hypochlorous acid solution formed from step (a) and a water soluble bromide ion source to the semi-permeable membrane.

22. A method of maintaining a purification system comprising
   a. preparing a stabilized hypobromous acid solution formed by contacting a stabilized hypochlorous acid solution comprising a chlorine source and a stabilizing agent with a bromide ion from a water soluble bromide ion source; and
   b. applying the stabilized hypobromous acid solution formed from step (a) to a semi-permeable membrane.

23. A method of cleaning a semi-permeable membrane comprising
   a. preparing a stabilized hypobromous acid solution formed by contacting a stabilized hypochlorous acid solution comprising a chlorine source and a stabilizing agent with a bromide ion from a water soluble bromide ion source;
   b. applying the stabilized hypobromous acid solution formed from step (a) to a semi-permeable membrane.

24. A method of defouling a semi-permeable membrane comprising
   a. preparing a stabilized hypobromous acid solution formed by contacting a stabilized hypochlorous acid solution comprising a chlorine source and a stabilizing agent with a bromide ion from a water soluble bromide ion source; and
   b. applying the stabilized hypobromous acid solution formed from step (a) to the semi-permeable membrane.

25. The method of any one of clauses 20 to 25, wherein the semi-permeable membrane is selected from the group consisting of a reverse osmosis membrane, a micro-filter, a nano-filter, an ultra-filter, a thin-film composite (TFC) membrane, a cellulose acetate (CA) membrane, a polyamide membrane, a microfiltration membrane, and an ultrafiltration membrane.

26. The method of any one of clauses 20 to 25, wherein the semi-permeable membrane is a reverse osmosis membrane.

27. The method of any one of clauses 20 to 26, wherein the chlorine source is an alkali metal hypochlorite, a alkaline earth metal hypochlorite or chlorine gas.

28. The method of any one of clauses 20 to 27, wherein the chlorine source is selected from the group consisting of sodium hypochlorite, potassium hypochlorite, lithium hypochlorite, magnesium hypochlorite, calcium hypochlorite, trichloroisocyanuric acid, sodium dichlorocyanuric acid, dichlorohydantoin, and mixtures thereof.

29. The method of any one of clauses 20 to 28, wherein the chlorine source is an alkali or alkaline earth metal hypochlorous acid containing about 5 to about 70% of chlorine as active halogen.

30. The method of any one of clauses 20 to 29, wherein the chlorine source is sodium hypochlorite or calcium hypochlorite.

31. The method of any one of clauses 20 to 30, wherein the water soluble bromide ion source is selected from the group consisting of sodium bromide, potassium bromide, lithium bromide, chlorine bromide, and bromine.

32. The method of any one of clauses 20 to 31, wherein the water soluble bromide ion source is sodium bromide.

33. The method of any one of clauses 20 to 32, wherein the stabilizing agent is elected from the group consisting of acid amide derivatives of carbonic acid, a carboxylic acid, an amino acid, sulfuric acid, or phosphoric acid.

34. The method of any one of clauses 20 to 33, wherein the stabilizing agent is sulfuric acid.

35. The method of any one of clauses 20 to 34, wherein the pH of the water being treated by the reverse osmosis system is in the range of about pH 5 to about pH 11, or about pH 6 to about pH 9, or about pH 6.5 to about pH 8.5, or about pH 7.0 to about pH 8.0.

36. The method of any one of clauses 20 to 35, wherein the pH of the water being treated by the reverse osmosis system is in the range of about pH 7.0 to about pH 8.0.

37. The method of any one of clauses 20 to 36, wherein the stabilized hypochlorous acid solution further comprises a corrosion inhibitor or scale inhibitor.

38. The method of clause 37, wherein the corrosion inhibitor is selected from the group consisting of an anodic corrosion inhibitor, a copper corrosion inhibitor.

39. The method of clause 37, wherein the corrosion inhibitor is selected from the group consisting of a chromate, a nitride, a orthophosphate, a silicate, and a molybdate.

40. The method of clause 37, wherein the scale inhibitor is an organophosphate or an acryl polymer.

41. The method of clause 40, wherein the organophosphate is selected from the group consisting of triethanolamine phosphate (TEAP), aminotrimethylene phosphonic acid (AMP), 1-hydroxyethylidene-1,1-diphosphonic acid (HEDP) and 2-phosphonobutane-1,2,4-tricarboxylic acid (PBTC).

42. The method of clause 40, wherein the acryl polymer is selected from the group consisting of a homo-acryl polymer, an acryl co-polymer, and an acryl tri-polymer.

EXAMPLES

Example 1

Maintenance of RO System

To test the efficacy of a mixture of stabilized chlorine and bromide in controlling biofouling while preserving the RO membrane, a mixture of stabilized chlorine with 0.15% sodium bromide was prepared according to the methods described in U.S. Pat. No. 7,341,671, incorporated herein by reference, and was added to the system water of an RO process. The mixture was added to maintain an average dosage of 5 ppm in the system water with a simple pump feeder.

The reverse osmosis membrane was a Toray TM720L-400 low pressure membrane, a cross-linked, fully-aromatic polyamide composite. This membrane has a diameter inch of 8 inches, a membrane area of 400 square feet, salt rejection percentage of 99.5%, a product flow rate of 8,500 gpd, and feed spacer thickness of 31 mm. The operating information provided by the manufacturer notes that the "presence of free chlorine and other oxidizing agents under certain conditions, such as heavy metals which acts as oxidation catalyst in the feed water will cause unexpected oxidation of the membrane. It is strongly recommended to remove these oxidizing agents contained in feed water before operating RO system."

Prior to the introduction of the stabilized chlorine and bromide mixture, biofouling in the RO system was controlled with a 1.5% isothiazolone solution, dosed at 3 ppm. To establish baseline measurements under previous isothiazolone use, system flow rates, pressures, and delta pressures were measured for 170 days prior to the introduction of the stabilized chlorine/bromide mixture. Following the application of the stabilized chlorine/bromide mixture, all measurements were taken over the course of an additional 230 days. See FIG. 1.

Table 1 provides a comparison of average permeate volume, average delta pressure, and the number of days between clean-in-place procedures due to biofouling of isothiazolone and the stabilized chlorine/bromide mixture prepared herein.

TABLE 1

| Biocide | Component | Dosage | Avg permeate (m³/hr) | Avg Delta Pressure (kg/cm²) | Interval of organic CIP (day) |
|---|---|---|---|---|---|
| Isothiazolone | ITO (1.5%) | 3 ppm | 77.8 | 3.0 | 77 |
| Example 1 | Stabilized bleach + bromide | 5 ppm | 78.8 | 2.1 | 173 |

The above results indicate that the use of the stabilized chlorine/bromide mixture provided significant benefits over the comparator cleaner. The average delta pressure obtained during the treatment period with the stabilized chlorine/bromide mixture was significantly lower indicating much more effective control of biofouling. Improved biofouling control is further evidenced by the greatly increased interval between required clean-in-place procedures, from an average of 77 days under the prior biocide, to 173 days with the stabilized chlorine/bromide mixture. Furthermore, observations of the RO membrane over the course of 230 days with use of the new mixture demonstrated that the new mixture did not cause any oxidation of the RO membrane.

The results can be seen in Table 2.

TABLE 2

| Pre-biocide insertion point (POINT: P/T PUMP) | | | | | | | | | | | |
|---|---|---|---|---|---|---|---|---|---|---|---|
| | 2014 | | | | | | 2015 | | | | |
| | June | July | Sept. | Oct. | Nov. | Dec. | Jan. | Feb. | Mar. | Apr. | May | June |
| PH | | | 6 | 6.5 | 5.61 | 6.89 | 5.93 | 6.27 | 5.75 | 5.52 | | |
| Conductivity (us/cm) | | | 27.7 | 162.3 | 4.08 | 2 | 10 | 18 | 3 | 3 | | |
| ORP (mv) | 231 | | 284 | 272 | 277 | 270 | 272 | 250 | 264 | 265 | | |
| T-halogen (ppm) | 0.15 | | 0.03 | 0.01 | 0.01 | 0.02 | 0.03 | 0.03 | 0.07 | 0.04 | | |
| F-halogen (ppm) | 0.04 | | 0.01 | 0.01 | 0.01 | 0.01 | 0.02 | 0.01 | 0.01 | 0.03 | | |

| Post-biocide insertion point (POINT: R/O H.P PUMP) | | | | | | | | | | | |
|---|---|---|---|---|---|---|---|---|---|---|---|
| | 2014 | | | | | | 2015 | | | | |
| | June | July | Sept. | Oct. | Nov. | Dec. | Jan. | Feb. | Mar. | Apr. | May | June |
| PH | | | 6.22 | 6.53 | 5.6 | 6.98 | 5.62 | 6.38 | 5.86 | 5.46 | | |
| Conductivity (us/cm) | | | 24.4 | 145.6 | 3.89 | 2 | 17 | 9 | 3 | 3 | | |
| ORP (mv) | | 263.1 | 277 | 260 | 270 | 284 | 280 | 265 | 275 | 271 | | |
| T-halogen (ppm) | | 0.23 | 0.23 | 0.25 | 0.26 | 0.28 | 0.02 | 0.3 | 0.34 | 0.3 | | |
| F-halogen (ppm) | | 0.02 | 0.02 | 0.01 | 0.02 | 0.05 | 0.01 | 0.01 | 0.02 | 0.01 | | |

| Produced Water | | | | | | | | | | | |
|---|---|---|---|---|---|---|---|---|---|---|---|
| | 2014 | | | | | | 2015 | | | | |
| | June | July | Sept. | Oct. | Nov. | Dec. | Jan. | Feb. | Mar. | Apr. | May | June |
| PH | | | 5.95 | 5.89 | 5.53 | 6.78 | 6.13 | 6.08 | 5.64 | 5.35 | | |
| Conductivity (us/cm) | | | 22.8 | 21.4 | 1.86 | 0.7 | 7 | 4 | 1 | 2 | | |
| ORP (mv) | 207 | 278.1 | 300 | 240 | 265 | 262 | 267 | 220 | 256 | 250 | | |
| T-halogen (ppm) | 0 | 0.01 | 0.01 | 0.02 | 0.01 | 0.01 | 0.01 | 0.03 | 0.06 | 0.03 | | |
| F-halogen (ppm) | 0.03 | 0.01 | 0.01 | 0.01 | 0.01 | 0.01 | 0.01 | 0.01 | 0.04 | 0.01 | | |

| Concentrate Water | | | | | | | | | | | |
|---|---|---|---|---|---|---|---|---|---|---|---|
| | 2014 | | | | | | 2015 | | | | |
| | June | July | Sept. | Oct. | Nov. | Dec. | Jan. | Feb. | Mar. | Apr. | May | June |
| PH | | | 6.29 | 6.77 | 4.9 | 7.05 | 5.44 | 6.95 | 6.17 | 5.59 | | |
| Conductivity (us/cm) | | | 37.3 | 351 | 14.88 | 9 | 61 | 50 | 11 | 9 | | |

TABLE 2-continued

| ORP (mv) | 163 | 233.2 | 280 | 269 | 308 | 324 | 292 | 285 | 306 | 288 |
|---|---|---|---|---|---|---|---|---|---|---|
| T-halogen (ppm) | 1.64 | 0.66 | 0.99 | 1.06 | 1.16 | 1.16 | 0.05 | 1.45 | 1.53 | 1.54 |
| F-halogen (ppm) | 0.02 | 0.01 | 0.05 | 0.03 | 0.02 | 0.02 | 0.02 | 0.02 | 0.07 | 0.01 |

Example 2

Stability of RO Membranes

To test RO membranes for stability in the presence of the biocide compositions of the present disclosure, twelve separate test stations were assembled. Each test station consisted of:

One 2 GPM delivery pump with pressure regulator (to maintain 60 psi incoming pressure), and flow regulator set to maintain consistent water flow of 0.17 GPM.

One 50 GPD Filmtec FT-30 reverse osmosis membrane element, composed of thin-film composite reverse osmosis membrane material, Filmtec's standard household under-sink reverse osmosis membrane element.

Each RO membrane was placed into a standard plastic housing, with a drain flow control attached to the ⅜" drain line coming off of the RO housing to regulate RO element recovery.

One 30 gallon polyurethane feedwater tank with ½" bulkhead outlet and ½" inlet bulkhead fittings.

25 gallons of de-chlorinated Charlotte Country, Fla. tap water (throughout the length of the 30 day test, de-chlorinated RO permeate water was added to each tank to account for water lost due to evaporation. The concentration of chlorine and the pH of each tank was also adjusted daily. Those adjustment times are noted on the attached spreadsheet. Below is the water chemistry (also used for all 3 Controls after all disinfectants were removed using a carbon block filter):

Total Dissolved Solids (TDS): 235 mg/L
Hardness (as CaCO3): 7 grains (120 mg/L)
Temperature: the temperature of each tank remained at approximately 76° F. (+/−3°)

Timer controls for each pump. Each station was set up to run water from the storage tank through the 50 GPD RO membrane/housing, and recirculate the permeate and concentrate water from the RO back into the storage tank. The timers were set so that each station ran water from the tank through the pump, into the RO, then back into the tank in 30 minute increments. After 30 minutes of running, each station was then shut down for 2 hours. After the 2 hours of down time, the systems would start again operating for 30 minutes. This on/off cycle continued without interruption for 30 days.

During the first two days of operation, measurements were recorded twice per day. From the 3rd day until the 30th day, measurements were taken once per day. These measurements consisted of:

Pressure—recording the pressure out of the pump (i.e. the inlet driving pressure to the RO membrane elements)

Permeate flow rate—recording the GPD of the product water from the RO membranes.

Concentrate flow rate—recording the GPD of the drain water from the RO membranes.

Percent recovery—permeate rate divided by the sum of the permeate and concentrate rates.

Feed TDS—recording the incoming TDS levels in each feed tank.

Permeate TDS—recording the TDS of the permeate water from the RO membrane.

Percent rejection—100 minus the permeate TDS divided by the feed TDS.

Chlorine concentrations and pH levels. These were adjusted as needed to maintain the following concentrations:

Three different concentrations of sodium bromide were used: 0.5%, 1.5% and 15%, all in 6.7% stabilized chlorine. Each concentration level was tested at three different pH levels: 5.0, 7.0 and 9.0. Total chlorine was maintained at 2 ppm. Three controls were included with this test—one for each pH level evaluated. Each control consisted of Charlotte County Florida tap water with all disinfectants removed.

Based on the data generated, it is apparent that at higher pH levels (at or above 7.0), the biocide of the present disclosure had no adverse effects on the life and functionality of thin-film composite reverse osmosis membrane material (at least over a 30 day continuous exposure period). At lower pH values, the disinfectant reacted with the RO membrane polymer over time—causing permanent damage. It should be noted that the although the volume of water flowing across and through each membrane amounted to approximately 49 GPD, the membrane attack appeared to be more pronounced during the stagnant periods, when the biocide had a longer contact time. The most relevant data for purposes of RO membrane functioning are the data provided at pH 7.0 because the overwhelming majority of municipal water sources operate at a neutral pH. It is worth noting, however, that, based on the results provided herein, the biocide described herein could be used in connection with RO membranes at pH levels either higher or lower than 7.0.

With respect to the specific measures taken during the procedures, the results are described as follows:

Pressure—The pressure in all experiments was measured at 60 psi throughout all experiments.

Figure 2A:
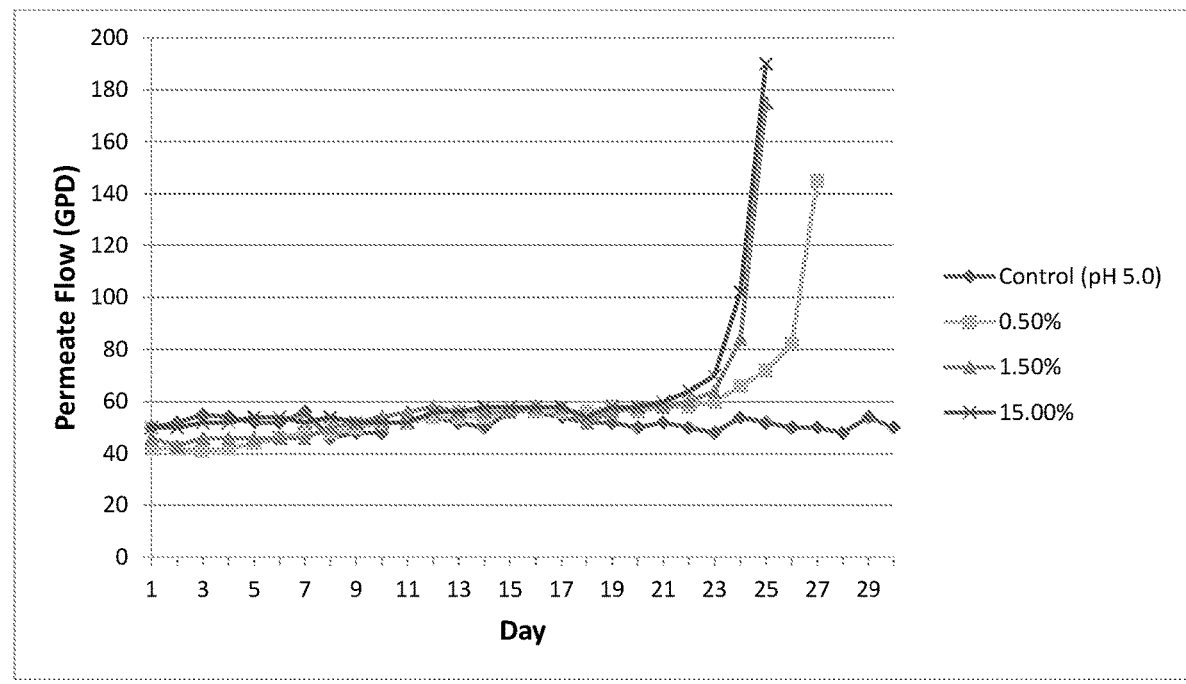
FIG. 2a shows data for experiments conducted at pH 5.0: Biocide with sodium bromide concentrations of 0.50% (■), 1.50% (▲), 15.00% (X), and control pH 5.0 water (♦).
Figure 2B:
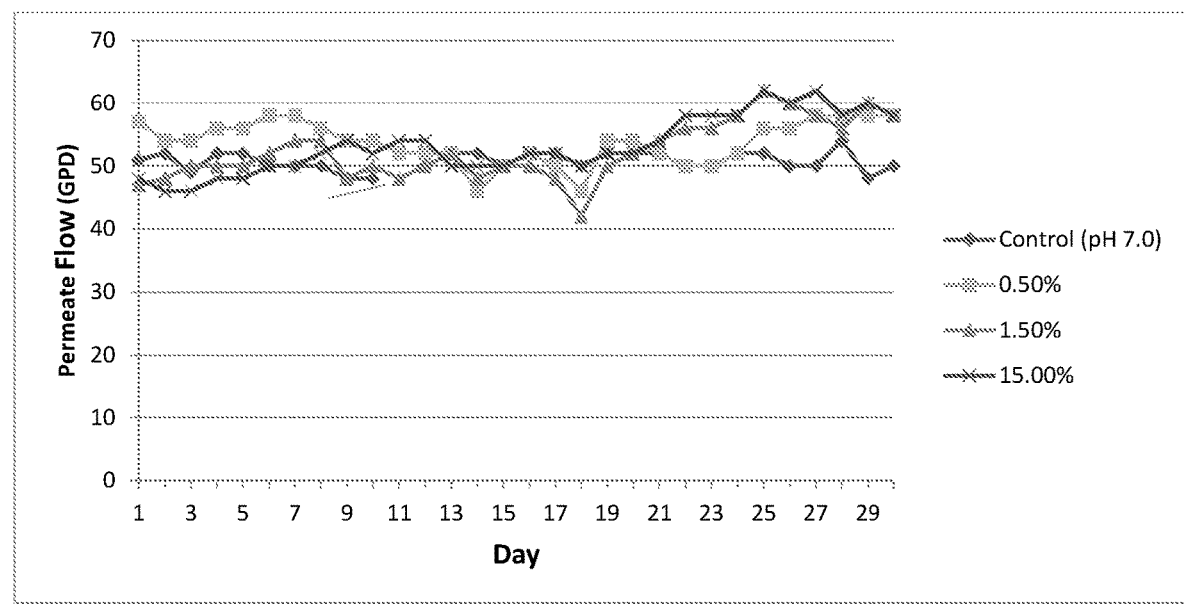
FIG. 2b shows data for experiments conducted at pH 7.0: Biocide with sodium bromide concentrations of 0.50% (■), 1.50% (▲), 15.00% (X), and control pH 7.0 water (♦).
Figure 2C:
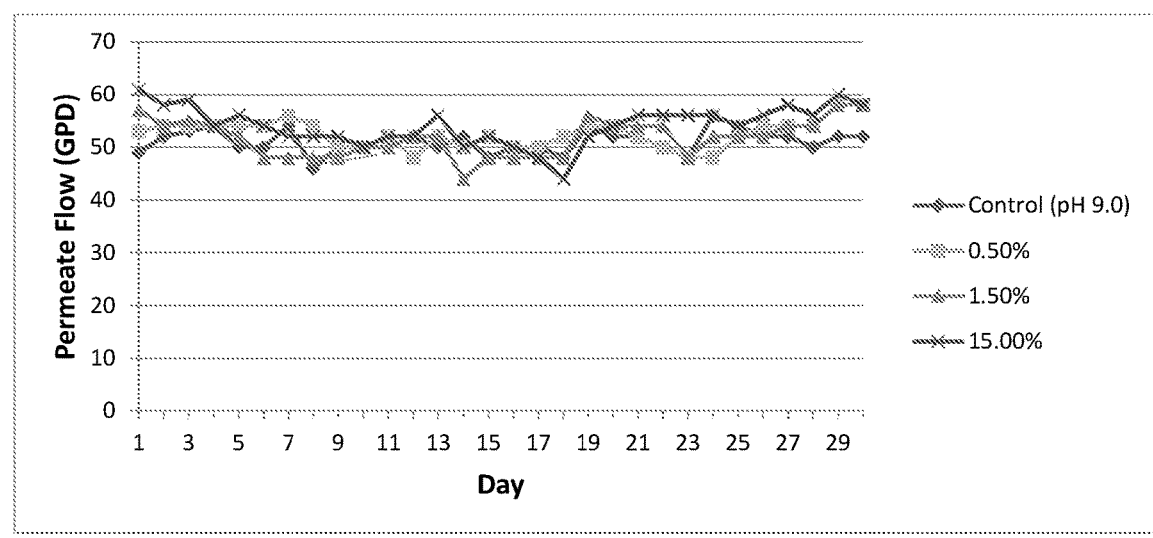
FIG. 2c shows data for experiments conducted at pH 9.0: Biocide with sodium bromide concentrations of 0.50% (■), 1.50% (▲), 15.00% (X), and control pH 9.0 water (♦).

Permeate flow rate—Results are shown in FIGS. 2a, 2b and 2c for biocide with concentrations of sodium bromide of 0.50%, 1.50% and 15.00% (plus control of pH 5.0 water, pH 7.0 water or pH 9.0 water).

Figure 3A:
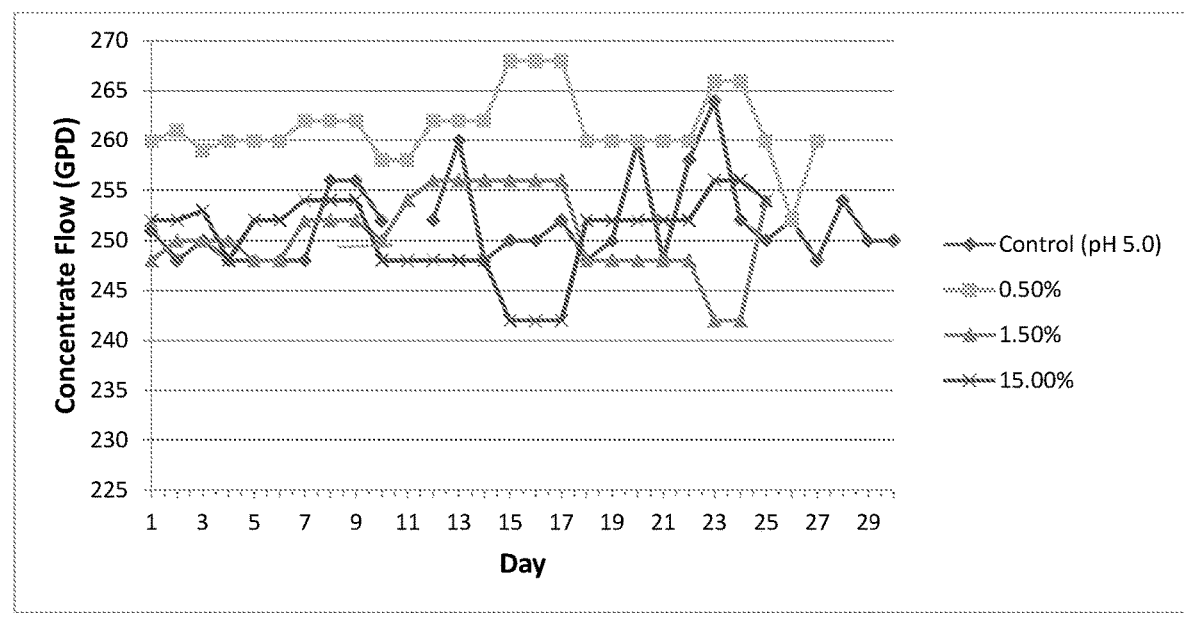
FIG. 3a shows data for experiments conducted at pH 5.0: Biocide with sodium bromide concentrations of 0.50% (■), 1.50% (▲), 15.00% (X), and control pH 5.0 water (♦).
Figure 3B:
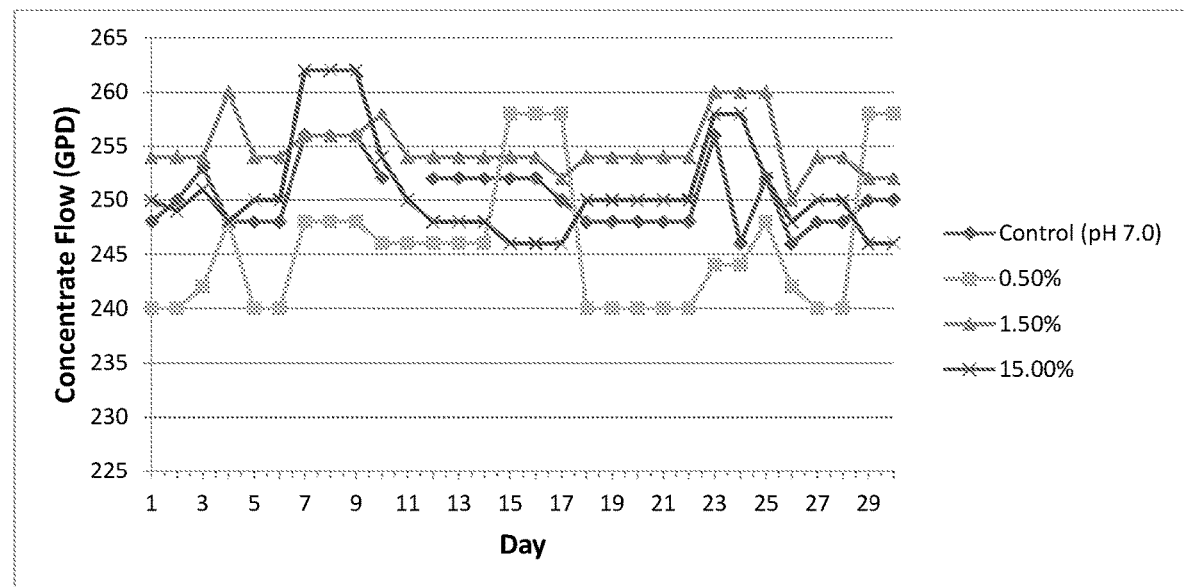
FIG. 3b shows data for experiments conducted at pH 7.0: Biocide with sodium bromide concentrations of 0.50% (■), 1.50% (▲), 15.00% (X), and control pH 7.0 water (♦).
Figure 3C:
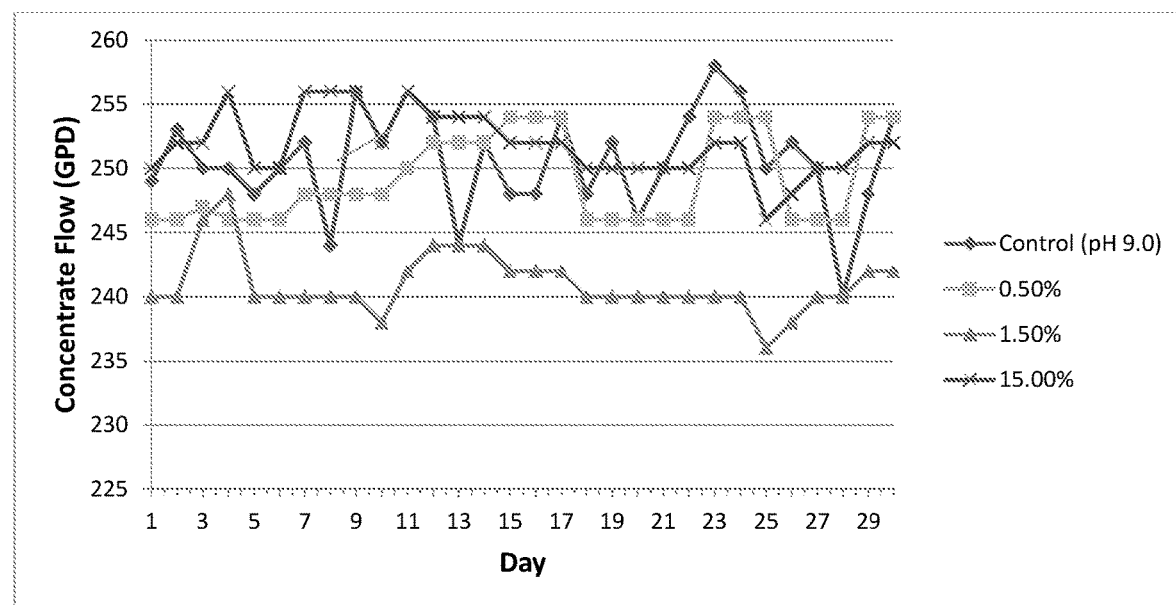
FIG. 3c shows data for experiments conducted at pH 9.0: Biocide with sodium bromide concentrations of 0.50% (■), 1.50% (▲), 15.00% (X), and control pH 9.0 water (♦).

Concentrate flow rate—Results are shown in FIGS. 3a, 3b and 3c for biocide with concentrations of sodium bromide of 0.50%, 1.50% and 15.00% (plus control of pH 5.0 water, pH 7.0 water or pH 9.0 water).

Figure 4A:
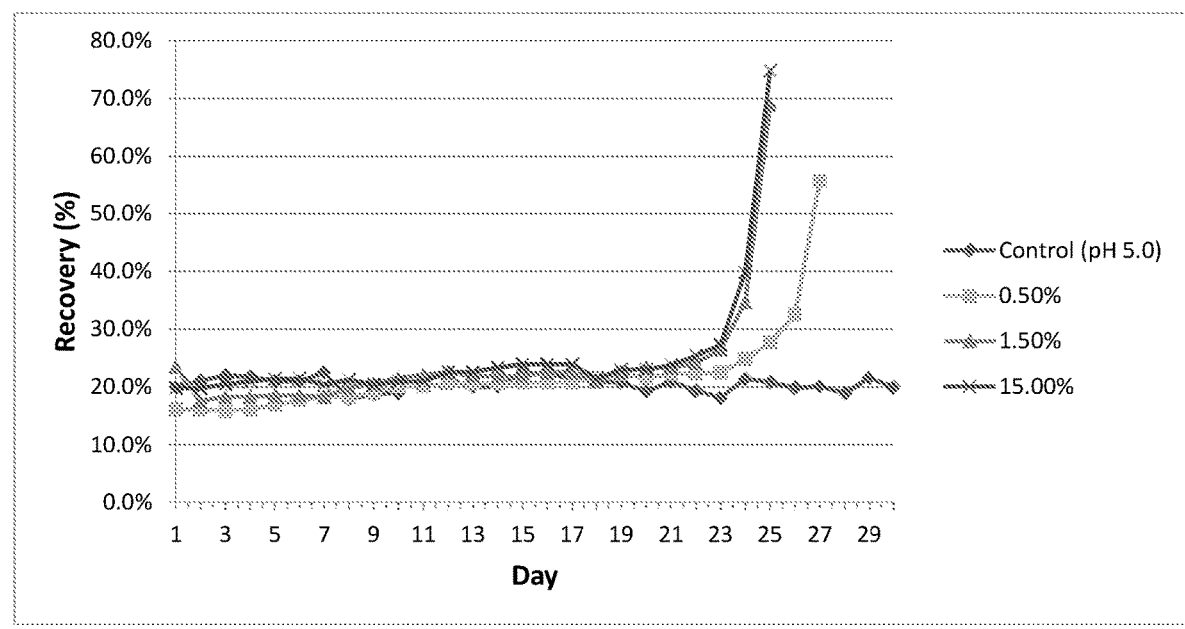
FIG. 4a shows data for experiments conducted at pH 5.0: Biocide with sodium bromide concentrations of 0.50% (■), 1.50% (▲), 15.00% (X), and control pH 5.0 water (♦).
Figure 4B:
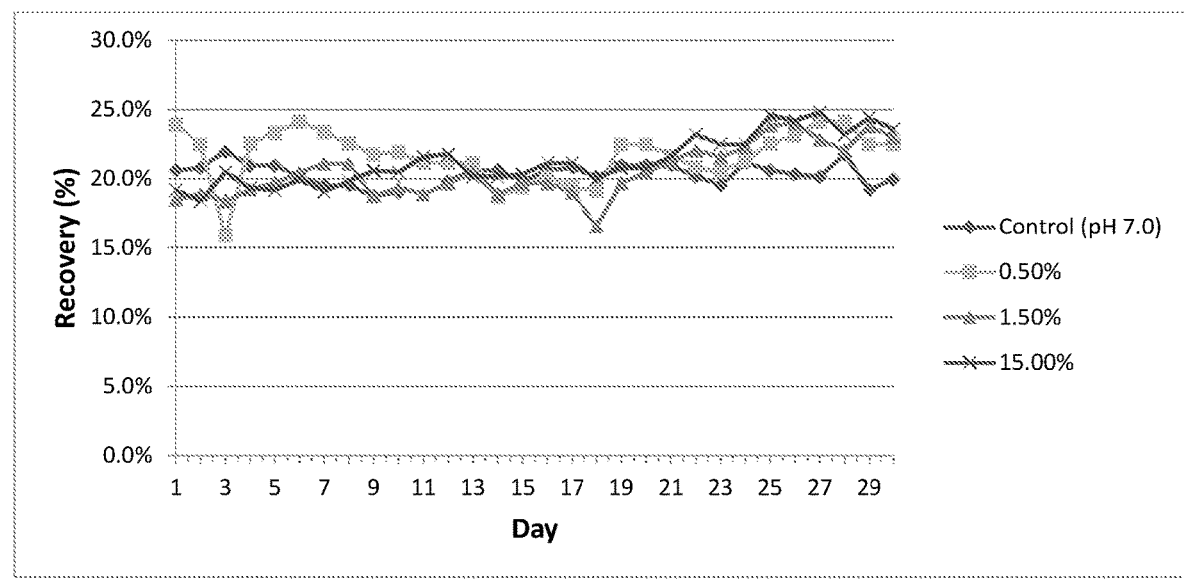
FIG. 4b shows data for experiments conducted at pH 7.0: Biocide with sodium bromide concentrations of 0.50% (■), 1.50% (▲), 15.00% (X), and control pH 7.0 water (♦).
Figure 4C:
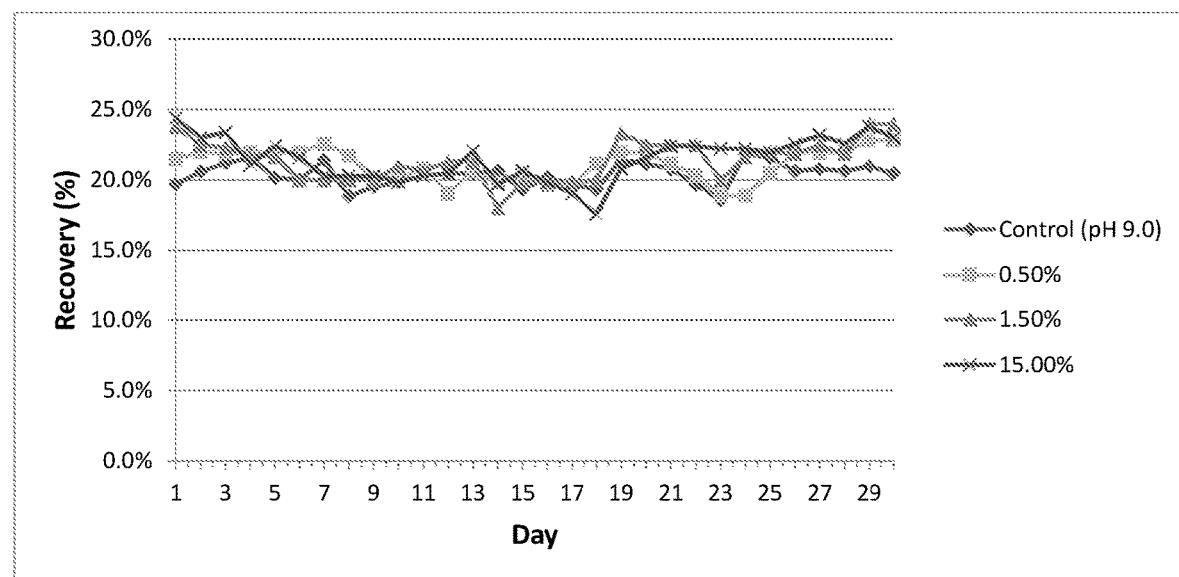
FIG. 4c shows data for experiments conducted at pH 9.0: Biocide with sodium bromide concentrations of 0.50% (■), 1.50% (▲), 15.00% (X), and control pH 9.0 water (♦).

Percent recovery—Results are shown in FIGS. 4a, 4b and 4c for biocide concentrations of 0.50%, 1.50% and 15.00% (plus control of pH 5.0 water, pH 7.0 water or pH 9.0 water).

Figure 5A:
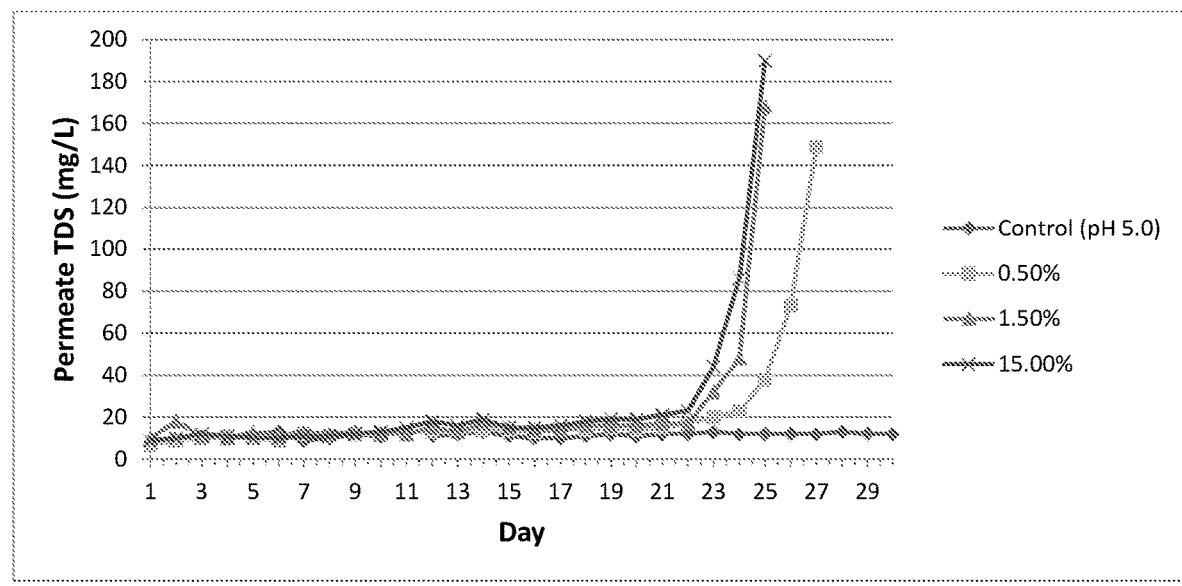
FIG. 5a shows data for experiments conducted at pH 5.0: Biocide with sodium bromide concentrations of 0.50% (■), 1.50% (▲), 15.00% (X), and control pH 5.0 water (♦).
Figure 5B:
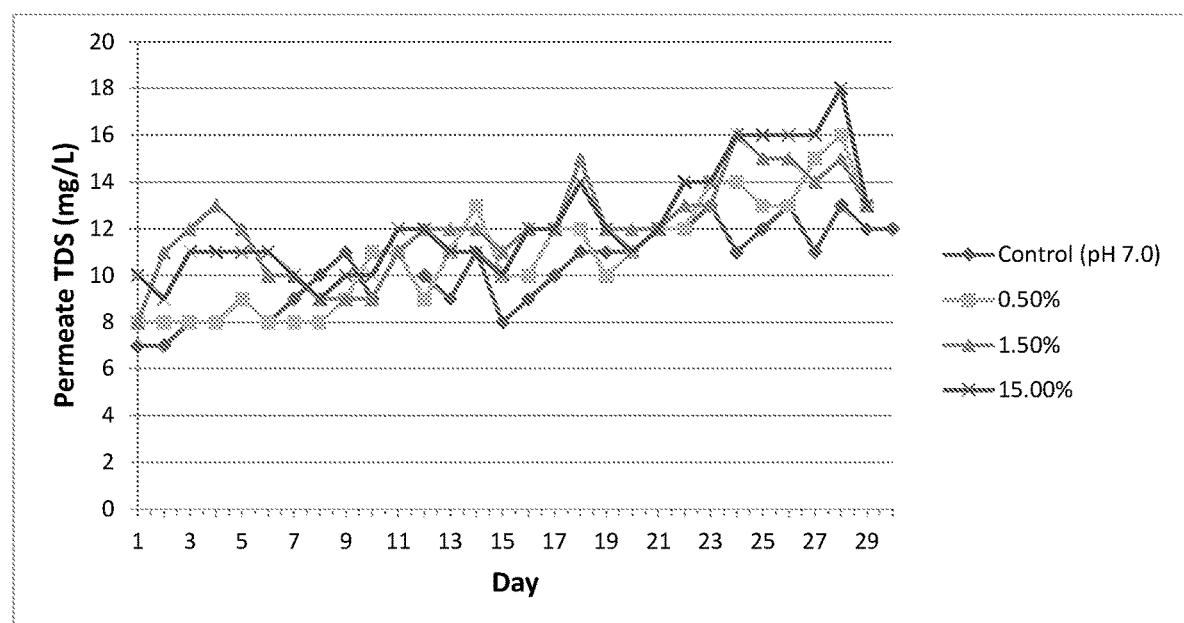
FIG. 5b shows data for experiments conducted at pH 7.0: Biocide with sodium bromide concentrations of 0.50% (■), 1.50% (▲), 15.00% (X), and control pH 7.0 water (♦).
Figure 5C:
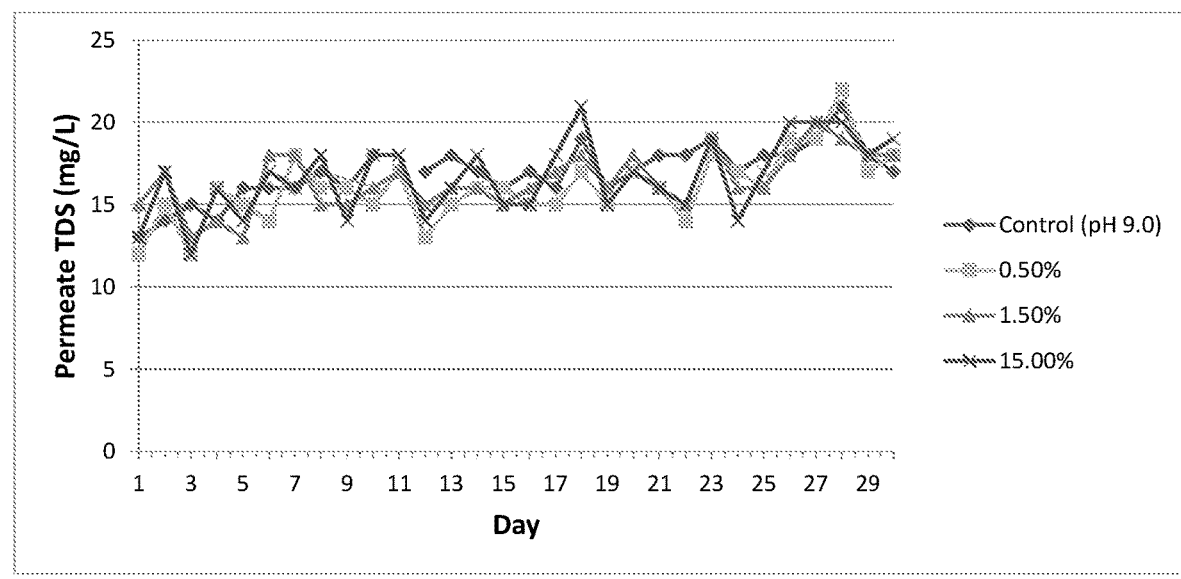
FIG. 5c shows data for experiments conducted at pH 9.0: Biocide with sodium bromide concentrations of 0.50% (■), 1.50% (▲), 15.00% (X), and control pH 9.0 water (♦).

Permeate TDS—Results are shown in FIGS. 5a, 5b and 5c for biocide concentrations of 0.50%, 1.50% and 15.00% (plus control of pH 5.0 water, pH 7.0 water or pH 9.0 water).

Figure 6A:
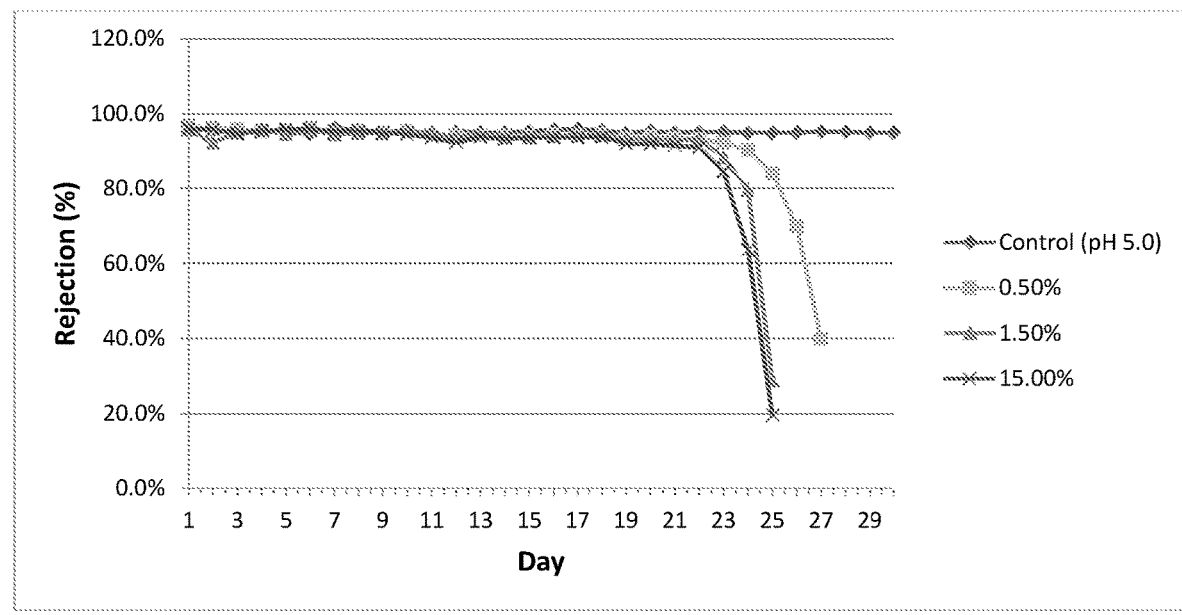
FIG. 6a shows data for experiments conducted at pH 5.0: Biocide with sodium bromide concentrations of 0.50% (■), 1.50% (▲), 15.00% (X), and control pH 5.0 water (♦).
Figure 6B:
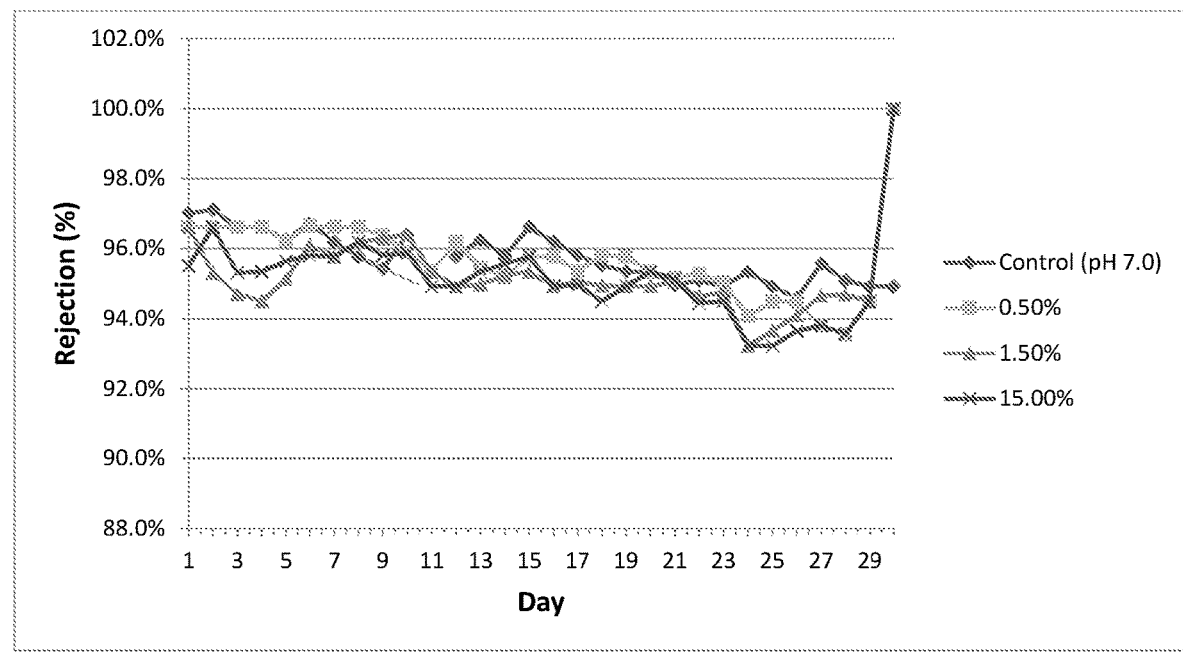
FIG. 6b shows data for experiments conducted at pH 7.0: Biocide with sodium bromide concentrations of 0.50% (■), 1.50% (▲), 15.00% (X), and control pH 7.0 water (♦).
Figure 6C:
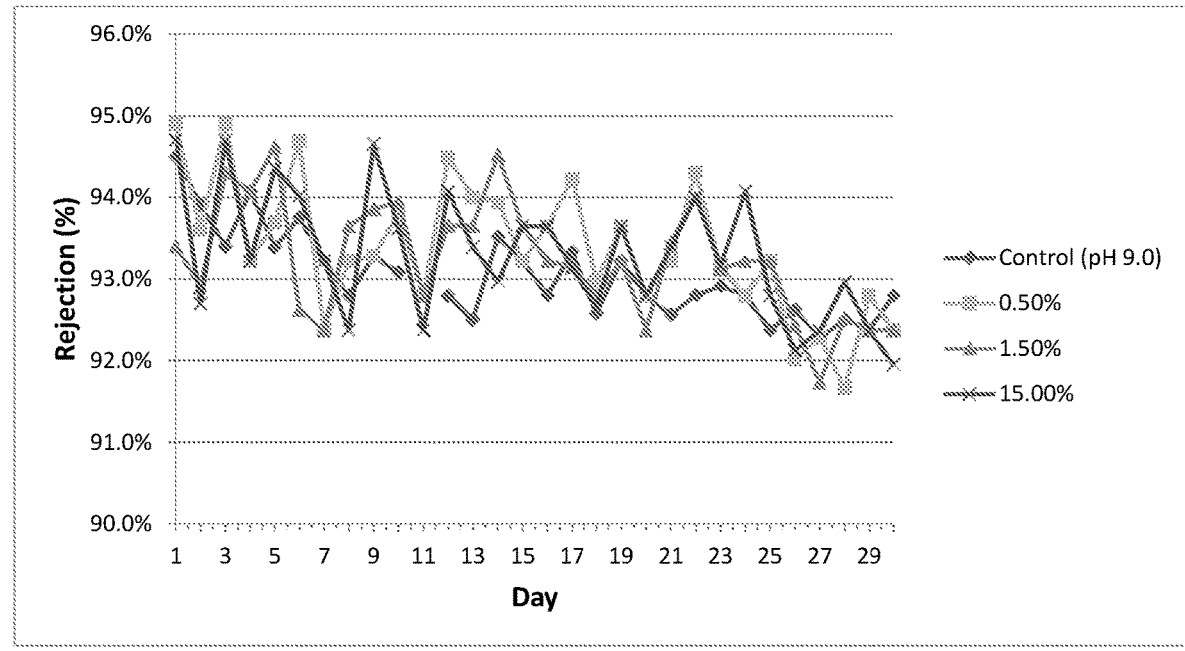
FIG. 6c shows data for experiments conducted at pH 9.0: Biocide with sodium bromide concentrations of 0.50% (■), 1.50% (▲), 15.00% (X), and control pH 9.0 water (♦).

Percent rejection—Results are shown in FIGS. 6a, 6b and 6c for biocide concentrations of 0.50%, 1.50% and 15.00% (plus control of pH 5.0 water, pH 7.0 water or pH 9.0 water).

What is claimed is:

1. A method of maintaining a reverse osmosis system comprising
   a. preparing a stabilized hypochlorous acid solution comprising a chlorine source selected from the group consisting of an alkali metal hypochlorite, an alkaline earth metal hypochlorite or chlorine gas and a stabilizer selected from the group consisting of urea, thiourea, creatinine, mono or di-ethanolamine, organic sulfonamide, biuret, sulfamic acid, organic sulfamate, and melamine; and b. consecutively or simultaneously applying the stabilized hypochlorous acid solution formed from step (a) and from about 0.5 wt % to about 15 wt % of a water soluble bromide ion source selected from the group consisting of sodium bromide, potassium bromide, lithium bromide, chlorine bromide, and bromine to a reverse osmosis membrane, to provide a biocide, wherein the biocide is added to the reverse osmosis system to a total halogen residual of from about 0.2 ppm to about 5 ppm, and wherein the water being treated by the reverse osmosis system is in the range of about pH 5 to about pH 9.

2. The method of claim 1, wherein the chlorine source is selected from the group consisting of sodium hypochlorite, potassium hypochlorite, lithium hypochlorite, magnesium hypochlorite, calcium hypochlorite, trichloroisocyanuric acid, sodium dichlorocyanuric acid, dichlorohydantoin, and mixtures thereof.

3. The method of claim 1, wherein the pH of the water being treated by the reverse osmosis system is in the range of about pH 6 to about pH 9, or about pH 6.5 to about pH 8.5, or about pH 7.0 to about pH 8.0.

4. The method of claim 1, wherein the stabilized hypochlorous acid solution further comprises a corrosion inhibitor or a scale inhibitor, wherein the corrosion inhibitor is selected from the group consisting of a chromate, a nitride, a orthophosphate, a silicate, and a molybdate, and the scale inhibitor is selected from the group consisting of an organophosphate and an acryl polymer.

5. The method of claim 1, wherein the step of maintaining is carried out for at least about 30 days of continuous exposure to the biocide.

6. The method of claim 1, wherein the step of maintaining is carried out for about 30 days to about 230 days of continuous exposure to the biocide.

7. The method of claim 1, wherein the step of maintaining is carried out for up to about 230 days of continuous exposure to the biocide.

* * * * *